US012736353B2

(12) United States Patent
Sierzega et al.

(10) Patent No.: US 12,736,353 B2
(45) Date of Patent: Sep. 15, 2026

(54) VEHICLE WITH VISUAL SIMULTANEOUS LOCALIZATION AND MAPPING SYSTEM AND DYNAMIC OUTLIER REJECTION FUNCTIONALITY

(71) Applicant: GM GLOBAL TECHNOLOGY OPERATIONS LLC, Detroit, MI (US)

(72) Inventors: Ryan A. Sierzega, Seattle, WA (US); Tarek A. R. Abdel Rahman, Madison Heights, MI (US); Bo Yu, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 58 days.

(21) Appl. No.: 18/975,166

(22) Filed: Dec. 10, 2024

(65) Prior Publication Data

US 2026/0160558 A1 Jun. 11, 2026

(51) Int. Cl.
*G06V 10/00* (2022.01)
*G01C 21/30* (2006.01)
(Continued)

(52) U.S. Cl.
CPC ................ *G01C 21/30* (2013.01); *G06T 7/74* (2017.01); *G06V 10/52* (2022.01); *G06V 10/764* (2022.01);
(Continued)

(58) Field of Classification Search
CPC . G01C 21/30; G06T 7/74; G06T 2207/20076; G06T 2207/30244;
(Continued)

(56) References Cited

U.S. PATENT DOCUMENTS 6,371,371 B1 4/2002 Reichenbach
10,657,343 B1 5/2020 Studnicka
(Continued)

FOREIGN PATENT DOCUMENTS

DE 102017128294 A1 6/2018
DE 102019003903 A1 1/2020
(Continued)

OTHER PUBLICATIONS

Pratik Agarwal, Gian Diego Tipaldi, Luciano Spinello, Cyrill Stachniss, and Wolfram Burgard, Robust Map Optimization using Dynamic Covariance Scaling, Mary 6-10, 2013, 2013 IEEE International Conference on Robotics and Automation (ICRA) (Year: 2013).*
(Continued)

*Primary Examiner* — Erin M Piateski
*Assistant Examiner* — Michael T Dowling
(74) *Attorney, Agent, or Firm* — Quinn IP Law

(57) ABSTRACT

A Visual Simultaneous Localization and Mapping (V-SLAM) system for a mobile host, e.g., a vehicle, includes a sensor suite and controller. The sensor suite collects raw input data used to estimate parameters of the host. The controller includes a processor and a computer storage medium ("memory") containing computer-readable instructions. Execution of the instructions by the processor causes the controller to receive the input data, use the input data to estimate poses of the host and calculate three dimensional (3D) coordinates of feature map points, and identify outliers in the feature map points using a predetermined linear algebra property, e.g., condition numbers. The controller also dynamically filters out the outliers using dynamic covariance scaling to generate a filtered feature map point set and transmits the set to a navigation system of the mobile host.

20 Claims, 5 Drawing Sheets

(51) Int. Cl.

| | |
|---|---|
| ***G06T 7/73*** | (2017.01) |
| ***G06V 10/52*** | (2022.01) |
| ***G06V 10/764*** | (2022.01) |
| ***G06V 10/77*** | (2022.01) |
| ***G06V 10/80*** | (2022.01) |
| ***G06V 20/56*** | (2022.01) |

(52) U.S. Cl.

CPC ........ *G06V 10/7715* (2022.01); *G06V 10/806* (2022.01); *G06V 20/56* (2022.01); *G06T 2207/20076* (2013.01); *G06T 2207/30244* (2013.01); *G06T 2207/30252* (2013.01)

(58) Field of Classification Search

CPC ........ G06T 2207/30252; G06V 10/806; G06V 10/7715; G06V 10/52; G06V 10/764; G06V 20/56

USPC .......................................................... 701/445

See application file for complete search history.

(56) References Cited

U.S. PATENT DOCUMENTS

| | | | | |
|---|---|---|---|---|
| 11,667,474 | B1 | 6/2023 | Ferdosali et al. | |
| 2011/0150346 | A1 | 6/2011 | Panetta | |
| 2012/0091204 | A1 | 4/2012 | Shi | |
| 2015/0095123 | A1 | 4/2015 | Wenninger | |
| 2016/0327395 | A1* | 11/2016 | Roumeliotis | G06T 7/20 |
| 2019/0131695 | A1 | 5/2019 | Thiruvarankan et al. | |
| 2019/0251847 | A1 | 8/2019 | Wu | |
| 2019/0294844 | A1 | 9/2019 | Burkhart et al. | |
| 2019/0325379 | A1 | 10/2019 | Medina et al. | |
| 2019/0329407 | A1* | 10/2019 | Qi | G05D 1/0248 |
| 2020/0082452 | A1 | 3/2020 | Malaprade et al. | |
| 2020/0096349 | A1 | 3/2020 | Black et al. | |
| 2020/0404245 | A1 | 12/2020 | Karvounis | |
| 2021/0033697 | A1 | 2/2021 | Vyunova et al. | |
| 2021/0065272 | A1 | 3/2021 | Phillips et al. | |
| 2021/0125370 | A1 | 4/2021 | Wang et al. | |
| 2021/0133410 | A1 | 5/2021 | Wang et al. | |
| 2021/0157998 | A1 | 5/2021 | Rodriguez | |
| 2022/0036586 | A1 | 2/2022 | Landron et al. | |
| 2022/0116673 | A1 | 4/2022 | Cho et al. | |
| 2022/0164557 | A1 | 5/2022 | Rossetto et al. | |
| 2023/0036188 | A1 | 2/2023 | Schmidt et al. | |
| 2023/0222907 | A1 | 7/2023 | Clifford | |
| 2024/0030052 | A1 | 1/2024 | Yoon et al. | |
| 2024/0113496 | A1 | 4/2024 | Blasczak et al. | |
| 2024/0143804 | A1 | 5/2024 | Mitschker et al. | |
| 2025/0054345 | A1 | 2/2025 | Sharma et al. | |
| 2025/0182651 | A1 | 6/2025 | Handshaw et al. | |
| 2025/0378626 | A1* | 12/2025 | Troy | G06T 7/344 |

FOREIGN PATENT DOCUMENTS

| | | | |
|---|---|---|---|
| DE | 202014011407 | | 4/2020 |
| DE | 102022111552 | A1 | 11/2022 |
| DE | 102022112395 | A1 | 11/2022 |
| DE | 102021132096 | A1 | 1/2023 |
| WO | 2012040644 | A1 | 3/2012 |
| WO | WO2023142379 | A1 | 8/2023 |

OTHER PUBLICATIONS

Dinh Van Nam, Kim Gon-Woo, Robust Stereo Visual Inertial Navigation System Based on Multi-Stage Outlier Removal in Dynamic Environments, May 21, 2020, sensors journal, MPDI (Year: 2020).*

Recognition system for QR code on moving car•; The 10th International Conference on Computer Science & Education (ICCSE 2015); Jul. 22-24, 2015. Fitzwilliam College, Cambridge University, UK.

Myung-Ryul Choi et al., Real-Time Moving Automotive Vehicle Identification System (AVIS), Aug. 6, 2002, IEEE Xplore, entire document, Year 2002, pp. 241-246.

* cited by examiner 12
170R
17
170
13
170R
10
11W
11
11B
17R
Rx
140
15
20
21
Processors
22
Memory
100
V-SLAM System
AA
240
14
19
Cameras
Systems
CCo
NAV
25
24
18
240
LL
II
I
BB
26
28

VEHICLE WITH VISUAL SIMULTANEOUS LOCALIZATION AND MAPPING SYSTEM AND DYNAMIC OUTLIER REJECTION FUNCTIONALITY

INTRODUCTION

Robots, autonomous vehicles, and other mobile host systems may use a Visual Simultaneous Localization and Mapping (V-SLAM) system to detect and comprehend features in a surrounding environment. A typical V-SLAM system employs cameras or other photosensors to capture real-time visual information/image data about the environment. The V-SLAM system also processes the collected image data and estimates the camera's position and orientation/pose, corrects accumulated errors, and generates environmental maps, e.g., for use by a navigation system of the mobile host system.

In general, a typical V-SLAM system is operable for detecting corners, edges, or other relevant map features. The V-SLAM system attempts to match the imaged map features in multiple different image frames and camera/host system poses. Corresponding feature map points are triangulated in free space when identifying matched features. A three-dimensional (3D) point cloud map is thereafter constructed from feature map points in the collective set of map features to describe key features in the surrounding environment. A controller connected to the V-SLAM system or integrally included therewith is able to precisely locate a position of the host system on a navigation map, a road surface, within a manufacturing plant, or in another environment, thus improving overall navigation accuracy.

SUMMARY

Disclosed herein are Visual Simultaneous Localization and Mapping (V-SLAM) system-based hardware and software solutions collectively operable for improving optimization stability and localization accuracy of a mobile host system. As appreciated in the art, navigation accuracy may be adversely affected by under-constrained or ill-conditioned feature map points, i.e., collected points lacking sufficient camera observations and/or image frames for precise location of the host system in its environment, or those that are otherwise significantly inconsistent with other observations. For example, signal and/or sensor obstruction or a global positioning system (GPS) denial of service may lead to poorly matched data when attempting to triangulate corresponding three-dimensional (3D) feature map points. Due to insufficient observations, similar patterns in collected images, and other factors, a V-SLAM system may create incorrect feature pairs. The incorrect feature pairs in turn may lead to the construction of an inaccurate 3D point cloud/3D map, subsequent reliance on which by a navigation system would reduce navigation accuracy. It is therefore desirable to remove the ill-conditioned data pairs ("outliers") using the approach set forth herein, with the outliers being points that are inconsistent with a current estimate of the 3D map and a current vehicle pose.

Embodiments of the strategy disclosed herein use dynamic covariance scaling and a condition number-based thresholding approach to reject ill-conditioned feature map points when such points are estimated by the V-SLAM system. Condition numbers (or another suitable linear algebra property) are used in some implementations to identify map points that contribute to an underdetermined matrix, and thus an unstable system represented thereby. As part of the present approach, moderately ill-conditioned feature map points are dynamically scaled as a function of the condition number. Ill-conditioned feature map points are filtered out and discarded, for instance by applying an infinite scaling factor. Well-conditioned feature map points are retained. The present approach leads to significant localization accuracy improvement and robustness, for example in GPS-denied operating environments such as urban canyons.

In accordance with an aspect of the disclosure, the V-SLAM system for a vehicle or other mobile host may include a sensor suite and a controller. The sensor suite is operable for sensing and outputting raw input data indicative of a position of features in a surrounding environment of the mobile host. The controller is in communication with the sensor suite and includes a processor and a computer storage medium ("memory"). The memory contains computer-readable instructions.

Execution of the instructions by the processor causes the controller to: receive the raw input data from the sensor suite, determine initial estimates of parameters of the mobile host using the input data, and calculate 3D coordinates of a plurality of feature map points based on the initial estimates of the parameters, including one or more poses of the mobile host. The controller also identifies outliers in the plurality of feature map points using a predetermined linear algebra property, and dynamically filter out the outliers using a dynamic covariance scaling approach utilizing the predetermined linear algebra property. In this manner the controller generates a filtered feature map point set. The controller thereafter transmits the filtered feature map point set to a navigation system of the mobile host.

The sensor suite may include global positioning system (GPS) receiver and one or more cameras, with the raw input data including multi-frame image data of the surrounding environment from the one or more cameras and GPS position data from the GPS receiver, the GPS data being indicative of an initial estimate of a current position of the mobile host. The sensor suite may also include an inertial measurement unit (IMU) configured to output IMU data indicative of a pose measurement of the mobile host at the current position. The processor in such an embodiment may be configured to determine the one or more poses of the host system using the IMU data.

Execution of the instructions by the processor may optionally cause the controller to identify the outliers in the feature map points using condition numbers as the predetermined linear algebra property, e.g., via comparison of the feature map points to a plurality of condition number thresholds. The controller may also estimate a respective one of the condition numbers, as estimated condition numbers, for each respective one of the feature map points, with the controller thereafter assigning a corresponding condition category for each of the feature map points based on the estimated condition numbers.

The condition category in one or more embodiments may include a first category for (i) well-conditioned feature map points, (ii) a second category for moderately ill-conditioned feature map points, and (iii) a third category for the outliers.

Execution of the instructions by the processor may cause the controller to dynamically scale the moderately ill-conditioned feature map points as a non-linear function of the condition number, thereby producing scaled feature map data points, and to transmit the scaled feature map data points to the vehicle system with the filtered feature map point set.

The sensor suite in one or more implementations may be connected to a vehicle body of a vehicle.

Also disclosed herein is a method for controlling a mobile host having a V-SLAM system. An embodiment of the method includes receiving raw input data from a sensor suite of the mobile host, and determining, via a processor of the V-SLAM system, initial estimates of parameters of the mobile host indicative of a corresponding position of features in a surrounding environment of the mobile host. The method further includes using the input data to estimate poses of the mobile host and 3D coordinates of a plurality of feature map points based on the poses of the mobile host, along with identifying outliers in the feature map points using a predetermined linear algebra property. The method may also include dynamically filtering out the outliers, using dynamic covariance scaling, to generate a filtered feature map point set, and then transmitting the filtered feature map point set to a navigation system of the mobile host to control a setting thereof.

A vehicle is also disclosed herein having a vehicle body, a set of road wheels connected to the vehicle body, a navigation system, and a V-SLAM system. The V-SLAM system for its part includes a sensor suite and a controller. The sensor suite, which is connected to the vehicle body and operable for sensing and outputting raw input data, includes a global positioning system (GPS) receiver, one or more cameras, and an inertial measurement unit (IMU) respectively configured to output, as the raw input data, (i) GPS position data, (ii) multi-frame image data, and (iii) IMU data indicative of a pose of the vehicle.

The controller in this embodiment is configured to receive the raw input data from the sensor suite, use the raw input data to estimate poses of the vehicle and 3D coordinates of a plurality of feature map points in the multi-frame image data, and identify outliers in the feature map points using condition numbers as a predetermined linear algebra property. The controller also dynamically filter out the outliers, via a dynamic covariance scaling process, to generate a filtered feature map point set, including identifying the outliers via comparison of the condition numbers to a plurality of condition number thresholds. The controller ultimately transmits the filtered feature map point set to the navigation system, with the navigation system thereafter using the filtered feature map point set to perform one or more navigation functions aboard the vehicle.

The above-noted and other features and advantages of the present teachings, are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

The appended drawings are not necessarily to scale and may present a simplified representation of various preferred features of the present disclosure as disclosed herein, including specific dimensions, orientations, locations, and shapes. Details associated with such features will be determined in part by the particular intended application and use environment.

DETAILED DESCRIPTION

Components of the embodiments disclosed herein may be arranged in a variety of possible configurations. Therefore, the following detailed description is not intended to limit the scope of the disclosure as claimed, but is merely representative of possible embodiments thereof. In addition, while numerous specific details are set forth in the following description in order to provide a thorough understanding of various representative embodiments, some embodiments are capable of being practiced without some of the disclosed details. In order to improve clarity, certain technical material understood in the related art has not been described in detail. Furthermore, the disclosure as illustrated and described herein may be practiced in the absence of an element that is not specifically disclosed herein.

Figure 1:
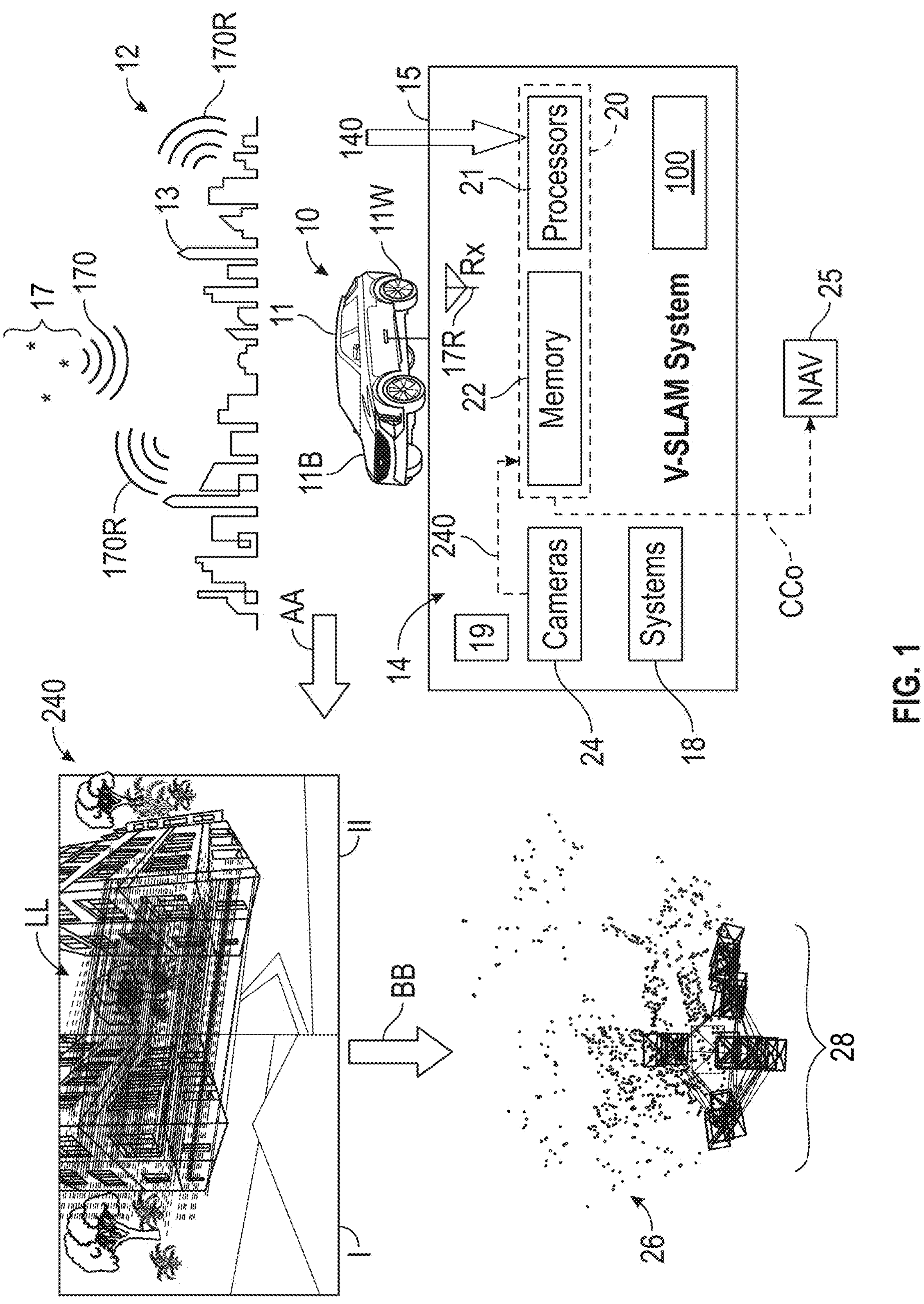
FIG. 1 schematically illustrates a representative mobile host system operating in a signal-compromised environment, with the mobile host system including a Visual Simultaneous Localization and Mapping (V-SLAM) system configured as set forth herein.

Referring now to the drawings, wherein like reference numbers refer to like features throughout the several views, FIG. 1 depicts a mobile host 10. The mobile host 10 is illustrated in the representative form of a vehicle 11, e.g., a battery electric, hybrid electric, or internal combustion engine (ICE)-powered motor vehicle. In such a configuration, the vehicle 11 includes a vehicle body 11B and a set of road wheels 11W connected to the vehicle body 11B, with one or more of the road wheels 11W being powered by a prime mover (not shown). The mobile host 10 may be alternatively configured as an automation robot, a mobile platform, farm equipment, a boat, or another mobile system or device in other implementations. Therefore, the vehicular depiction and exemplary description provided below are intended to be illustrative of the present teachings without being limiting thereof.

In accordance with the present teachings, the mobile host 10 of FIG. 1 is equipped with a Visual Simultaneous Localization and Mapping (V-SLAM) system 15. The V-SLAM system 15 may include a sensor suite 14 operable for collecting raw input data suitable for use in determining parameters of the mobile host 10 and estimating its pose in a surrounding environment 12 of the mobile host 10. The sensor suite 14 as set forth herein may optionally include a GPS receiver (Rx) 17R, an inertial measurement unit (IMU) 19, and/or one or more cameras 24, which collectively sense and output the above-noted input data 140. The camera(s) 24 may include electrooptical photosensors and/or other suitable image/distance sensors such as lidar, radar, ultra-wideband sensors, etc.

The V-SLAM system 15 is configured as set forth below with reference to FIGS. 2-5 to improve navigation accuracy aboard the mobile host 10. The mobile host 10 is also equipped with an electronic controller 20, i.e., one or more computer devices that are separate from the V-SLAM system 15 or integral therewith (as shown). The controller 20 is configured to execute computer-readable instructions embodying a method 100, a representative embodiment of which is illustrated in FIG. 4. Execution of such instructions enables the V-SLAM system 15 to perform the various functions described herein.

At times, the mobile host 10 may operate in a signal-compromised manner within the surrounding environment 12, e.g., an urban canyon. The term "urban canyon" as used herein refers to a city or industrial area in which several multi-story buildings 13 or other tall manufactured or naturally occurring obstructions are arranged along a route of the mobile host 10. Structure not shown in FIG. 1 but well understood in the art such as water towers, elevated roadways, car parks/garages, and the like may similarly combine to form such an urban canyon, or the obstructions may include mountains or other naturally occurring elevated structures.

In the representative signal-compromised environment 12 of FIG. 1, the various buildings 13 may block clear receipt of global positioning system (GPS) signals 170 transmitted by an orbiting constellation of GPS satellites 17. Materials used to construct the walls, edifices, roofs, and other surfaces of the buildings 13, e.g., glass, steel, concrete, etc., may reflect the GPS signals 170 away from the GPS receiver 17R of the mobile host 10 as multi-path reflections 170R. As a result, navigation and related functions of one or more autonomous systems 18 of the mobile host 10, and thus of the V-SLAM system 15, may operate in a suboptimal manner. The mobile host 10 may operate in other signal-compromised environments 12 in other scenarios, and therefore the urban canyon example of FIG. 1 is intended to be illustrative of the present teachings and non-limiting thereof.

As appreciated by those skilled in the art, the V-SLAM system 15 uses the camera(s) 24 during operation of the mobile host 10 to collect multiple image frames of a given obstacle or environmental feature and output the same as multi-frame image data 240. Image data collection as part of the input data 140 is represented by arrow AA in FIG. 1, with two imaged scenes I and II shown for simplicity. The image frames have various feature map points 26. Scenes I and II contain the same feature map points 26 at two separate times and/or 3D poses 28 of the mobile host 10 and cameras 24 connected thereto, e.g., to the vehicle body 11B. Corresponding feature map points 26 in each of the image frames are linked, with the linking lines shown generally as LL. In an actual implementation, however, the various scenes may not have corresponding feature map points due to, e.g., occlusion of the camera 24, signal loss, etc.

As represented by arrow BB of FIG. 1, the feature map points 26 are output from the image data 240 provided by the camera(s) 24. The 3D positions of the feature map points 26 are calculated by triangulation with consecutive frames in the image data 240, mainly to estimate their initial positions, which are then optimized simultaneously along with the camera pose or position. Some feature map points 26 may lack sufficient information to be located precisely, making it difficult to estimate a unique solution. These feature map points 26 may be under-constrained or ill-conditioned as described below, others may be well-conditioned, and still others may be moderately ill-conditioned. Using the present approach, the feature map points 26 will be evaluated and either filtered out/discarded (ill-conditioned), used "as is" (well-conditioned), or dynamically scaled in accordance with a non-linear algebraic function (moderately ill-conditioned), e.g., using dynamic covariance scaling as described in detail below. The three nominal condition categories will be described in detail below, with an example approach illustrated in FIGS. 4 and 5.

The controller 20 is depicted schematically in FIG. 1 as having one or more processors 21 and memory 22, the latter being inclusive of non-transitory memory or tangible non-transitory computer storage media/devices (read only, programmable read only, solid-state, random access, optical, magnetic, etc.). The memory 22, on which computer-readable instructions embodying the method 100 of FIG. 4 may be recorded, is capable of storing machine-readable instructions in the form of one or more software or firmware programs or routines, combinational logic circuit(s), input/output circuit(s) and devices, signal conditioning and buffer circuitry and other components that can be accessed by one or more processors to provide a described functionality.

Additionally with respect to the controller 20 and the V-SLAM system 15, input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. Each controller executes control routine(s) to provide desired functions. Ultimately, the controller 20 outputs a control signal (arrow CCo) containing a filtered feature map point set to a navigation system (NAV) 27 to control a setting of the navigation system 27. The control signal (arrow CCo) in such an implementation is operable for changing a setting of a navigation map for use during possibly autonomous operation of the mobile host 10, with other systems possibly benefitting from the present teachings.

V-SLAM STRATEGY: In general, the strategy described herein utilizes a suitable linear algebra property, exemplified herein as a condition number, to identify feature map points 26 that would otherwise contribute to an undetermined system. As appreciated in the art in the context of a modeled system, an undetermined system has fewer independent equations/constraints than the number of unknown variables to be solved for. In an undetermined system, many viable solutions could satisfy a given set of conditions. In the context of generating a 3D point cloud using the V-SLAM system 15 of FIG. 1 for assisting navigation or other functions, therefore, it is desirable to filter out ill-conditioned feature map points 26 that would otherwise contribute to an undetermined condition. Such points are referred to hereinbelow as outliers.

To that end, outliers are first required to be identified. This important task may be accomplished in accordance with the present disclosure. As part of the present strategy, feature map points 26 generated by the V-SLAM system 15 and its camera(s) 24 or other sensors are characterized by the controller 20 of FIG. 1 into multiple distinct classes or categories, for example: (i) ill-conditioned, (ii) moderately ill-conditioned, and (iii) well-conditioned. This classification is performed in one or more embodiments based on an estimated condition number as noted above.

Within the representative three condition categories mentioned above, identified ill-conditioned feature map points 26 are filtered out, i.e., deleted and not considered. Moderately ill-conditioned feature map points 26 are dynamically scaled, for instance as a non-linear function of the estimated condition number. Well-conditioned feature map points 26 are treated as trusted points, and thus are used without scaling, i.e., using unitary scaling. The present approach therefore improves localization accuracy and robustness, particularly when employed in GPS-denied and other signal-compromised environments such as a representative urban canyon shown in FIG. 1. Thus, the present teachings seek to identify outliers, model severance, dynamically scale uncertainty, e.g., using dynamic covariance scaling, and improve point cloud accuracy.

To provide an optimal solution, the present strategy utilizes condition numbers to model ill-conditioned feature map points 26, i.e., the above-noted outliers. Points that are not deemed to be truly ill-conditioned, but which at the same time are not well-conditioned, are treated herein as being moderately ill-conditioned. Instead of filtering out the moderately ill-conditioned feature map points 26, however, the present approach dynamically scales the feature map points 26 using a non-linear function of, e.g., the condition number. Severance as used herein refers to the process of identifying and removing the unreliable or erroneous feature map points 26 to improve the accuracy of the generated 3D map/point cloud. By extension, the availability of an improved 3D map increases navigation system-based representations of the surrounding environment.

Figure 2:
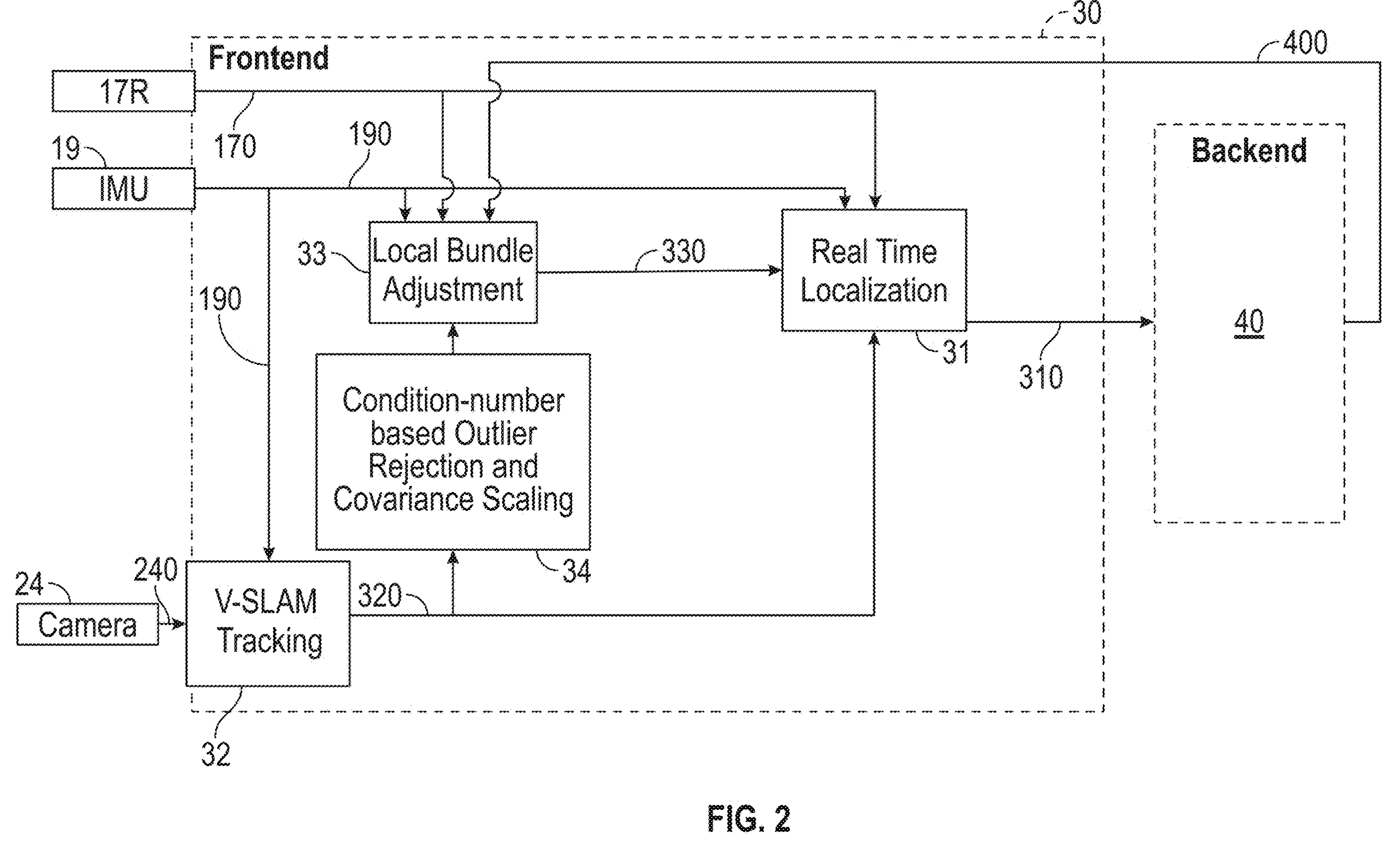
FIG. 2 is a block diagram of a representative frontend system construction of the V-SLAM system shown in FIG. 1.
Figure 3:
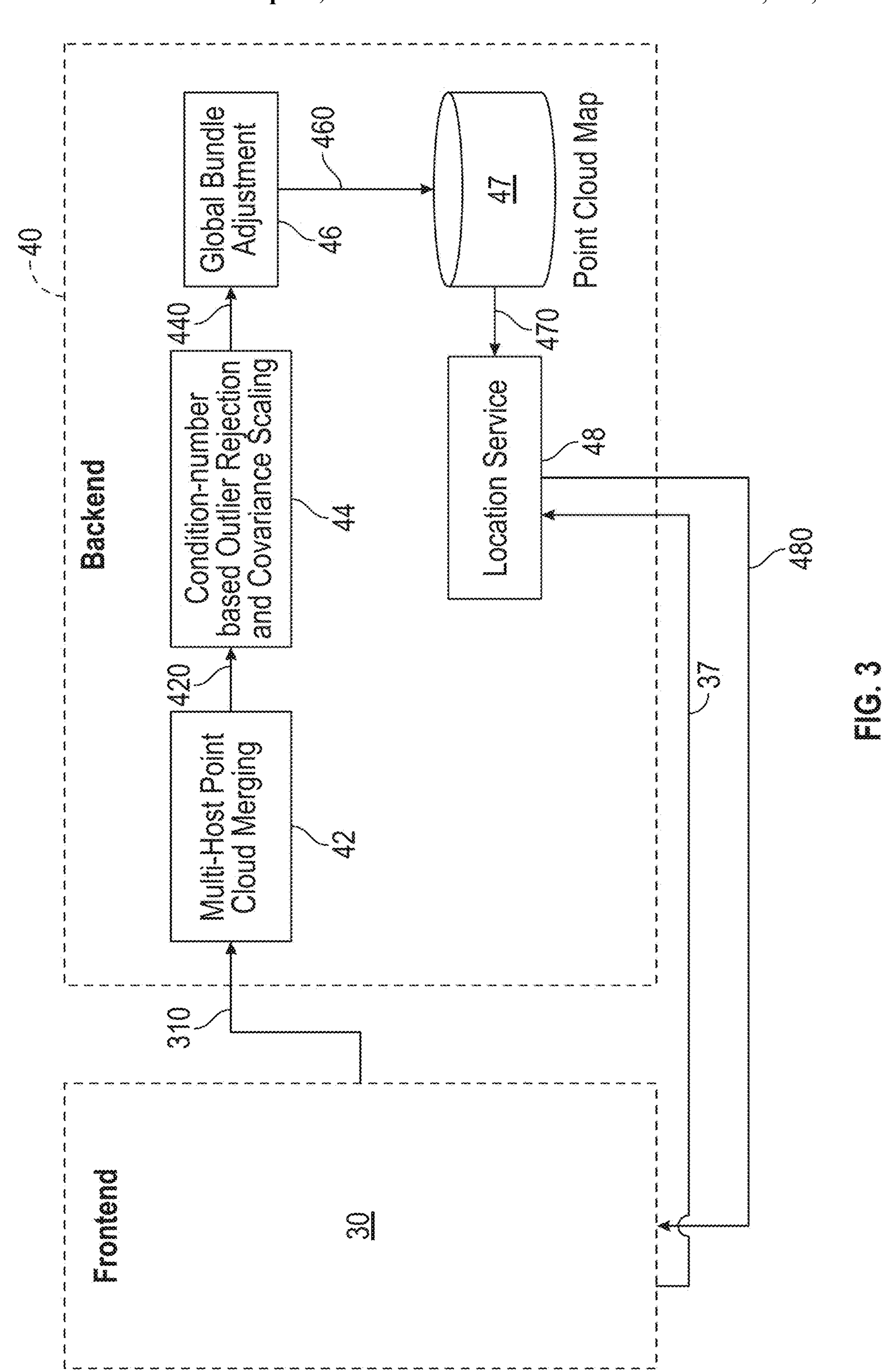
FIG. 3 is a block diagram of a representative backend system construction usable with the frontend shown in FIG. 1.
Figure 4:
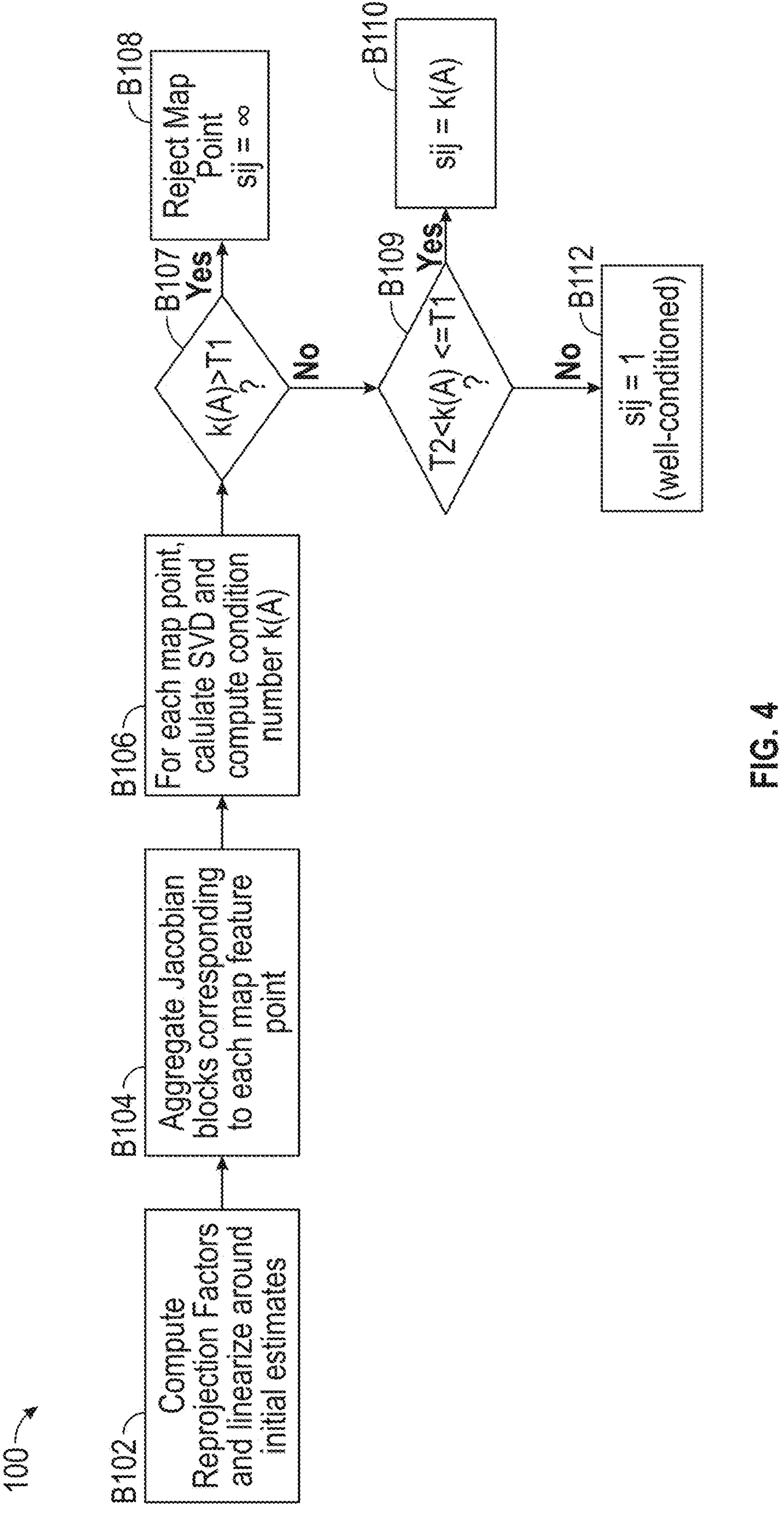
FIG. 4 is a flowchart describing a method for rejecting outliers using condition number-based factor covariance modeling in accordance with an aspect of the disclosure.

FIGS. 2 and 3 respectively illustrate embodiments of a frontend architecture 30 and a backend architecture 40 of the V-SLAM system 15 of FIG. 1. The GPS receiver 17R, the IMU 19, and the camera(s) 24 feed information (as the raw input data 140 of FIG. 1) into the frontend architecture 30, which may be hosted aboard the vehicle 11 or other mobile host 10. The GPS receiver 17 and IMU 19 respectively transmit GPS signals 170 and IMU signals 190, e.g., acceleration, pitch, yaw, and roll of the mobile host 10, to a real-time localization block 31. Block 31 also receives tracking signals 320 from a V-SLAM tracking block 32. The IMU signals 190 are also transmitted to the tracking block 32, e.g., a computer vision module operable for detecting features in the surrounding environment 12 (FIG. 1), and thus for providing an initial estimate of 3D poses 28 (see FIG. 1) of the mobile host 10 and 2D/3D feature map points corresponding to such 3D poses 28 when the multi-frame image data 240 of FIG. 1 is collected.

The frontend architecture 30 of FIG. 2 also includes a local bundle adjustment block 33 and an outlier rejection block 34. As used herein, the local bundle adjustment block 33 is an optimizer of a type appreciated in the art. An important measure of optimization robustness of block 33 is how sensitive the output of a system is to small changed or errors in its input. Minor changes in input such as noise, e.g., visual reprojection factor noise, should result in slight changes in output. Applying condition-based robust techniques, slight changes in estimated visual reprojection noise should yield nearly stable results in terms of accuracy. Output signals 330 from block 33 are provided to the real-time localization block 31 summarized above, e.g., as optimized key frames and optimized 3D feature map points. The real time localization block 31 noted above, running at a higher frequency than block 33, consumes the latest GPS and IMU measurements. In this manner the real time localization block 31 performs sensor fusion to output an optimized 3D feature map points 310 to the backend architecture 40 described below with reference to FIG. 3, with the backend architecture 40 possibly outputting a feedback signal 400 to the local bundle adjustment block 33 for the purpose of loop closures.

FIG. 3 illustrates a possible implementation of the backend architecture 40 shown generically in FIG. 2. The backend architecture 40 may be located onboard the mobile host 10 of FIG. 1 in one or more embodiments, or the backend architecture 40 may be cloud-based or remote from the mobile host 10. Backend systems such as the backend architecture 40 of FIG. 3 are appreciated in the art, and typically include a multi-host point cloud merging block 42, a global bundle adjustment block 46, a 3D point cloud map/database 47, and a location service block 48. Each of blocks 42, 46, 47, and 48 output a corresponding outputs 420, 460, 470, and 480 as shown, with output 480 being a loop closure signal 480.

The location service block 48 in particular may receive an input location query 37 from the frontend architecture 30 (see FIG. 2) in some implementations, with the location service 48 providing the loop closure signal 480 when the same area of the environment is revisited and similar features detected from the frontend architecture 30, match with corresponding features stored in a place recognition database of the backend architecture 40. As appreciated in the art, the “multi-host” aspect of block 42 may merge feature map point data when the mobile host 10 of FIG. 1 returns to the same location. That is, the backend architecture 40 is operable for receiving the optimized 3D map feature map point 26 from the frontend architecture 30, merging the optimized 3D feature map points 26 with global data from a plurality of additional mobile hosts 10, e.g., vehicles 11, to form merged location data, and communicating a loop closure signal to the fronted architecture 30 that is indicative of the merged location data.

The global bundle adjustment block 46 may compile larger or more global data sets, for instance an entire commute rather than just a local scene or portion thereof. The location service block 48 may be a real-time service for the frontend architecture 30, e.g., a storage site for a most likely to be accurate location. For instance, the location service block 46 of the backend architecture 40 may have data from hundreds or thousands of mobile hosts 10.

Figure 5:
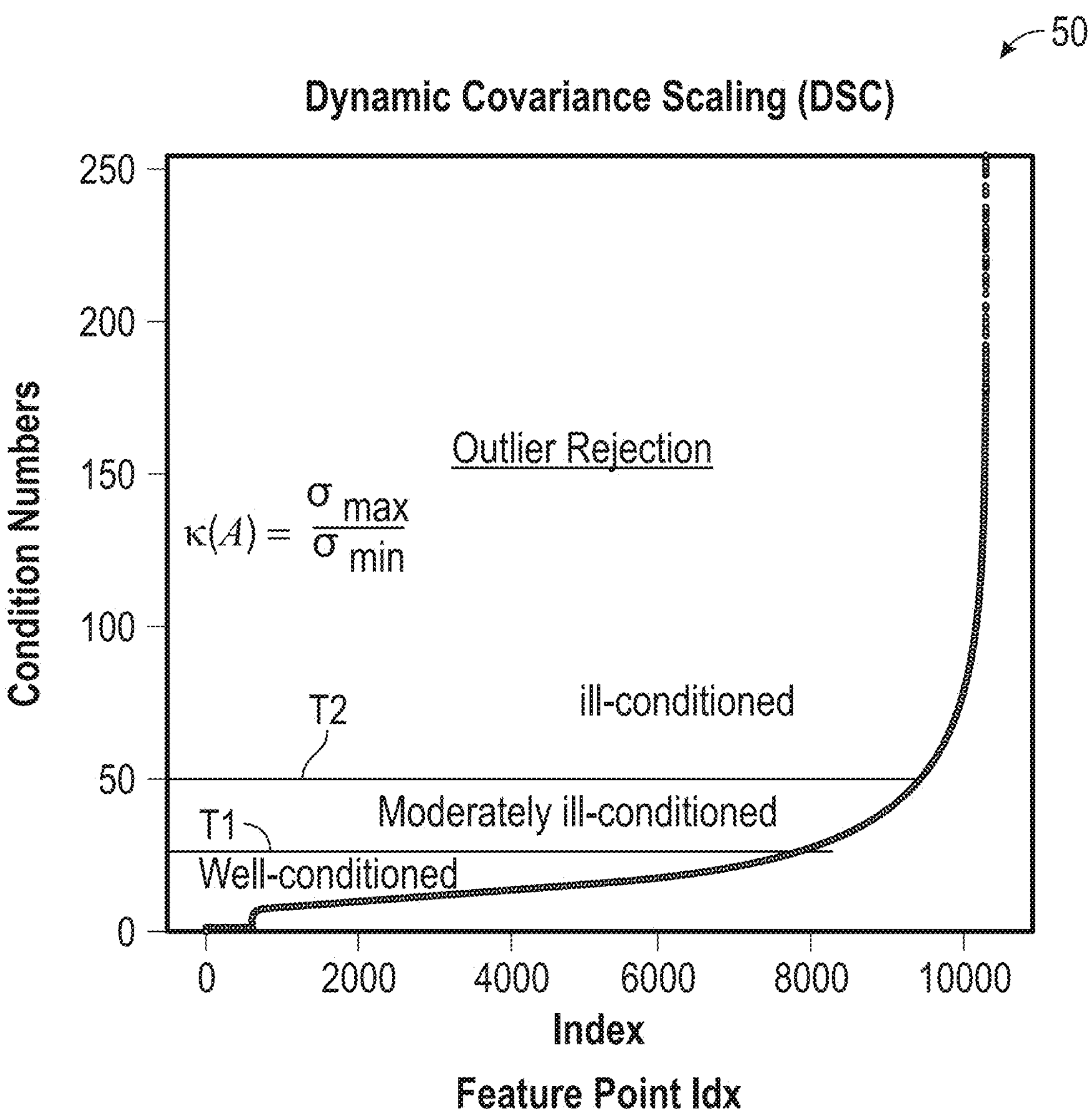
FIG. 5 is a plot of condition number (vertical axis) versus feature map points (horizontal axis) usable as part of the method of FIG. 4.

To this V-SLAM backend architecture one may integrate an outlier rejection block 34 to provide a myriad of benefits. As with block 34 of FIG. 2, block 44 provides a robust outlier rejection capability when rejecting under-constrained/ill-conditioned feature map points. Aspects of blocks 34 and 44 of respective FIGS. 2 and 3 enable dynamic covariance scaling of feature map points utilizing condition number-based approach, e.g., as shown in FIG. 5. Using blocks 34 and 44, for instance, the V-SLAM system 15 of FIG. 1 is able to model the contribution of each feature map point and selectively reject ill-conditioned feature map points, dynamically scale moderately ill-conditioned map points as a non-linear function of its computed condition number. The present approach also mitigates the effect of critical moderately-ill conditioned map points without filtering them out, thus maintaining the map representation of the environment, e.g., the surrounding environment 12 of FIG. 1.

Referring to FIG. 4, the method 100 is described in terms of discrete logical steps, code segments, or logic blocks for illustrative clarity. The various blocks may be embodied as computer readable instructions stored in memory 22 of FIG. 1 and executed by the processor(s) 21 when the mobile host 10 is in operation.

In general, the method 100 involves a process by which the controller 20, in communication with the sensor suite 14 of FIG. 1, executes the above-noted instructions via the processor 21 to cause the controller 20 to receive the raw input data 140 (such as the image data 240) from the sensor suite 14 for determining initial estimates of parameters (including poses) of the mobile host 10, use the input data 140 to calculate 3D coordinates of a plurality of feature map points 26, and then identify outliers in the feature map points 26 using a predetermined linear algebra property. Condition numbers are used in the example of FIGS. 4 and 5 as a representative linear algebra property. The controller 20 also dynamically filter out the outliers, e.g., using dynamic covariance scaling, to generate a filtered feature map point set, ultimately transmitting or communicating the filtered feature map point set to the navigation system 27 of the mobile host 10.

A representative embodiment of the method 100 commences at block B102 with the controller 20, after receiving the raw input data 140 from the sensor suite 14, using the processor 21 to process/optimize the raw input data 140 to infer initial estimates of various parameters of the mobile host 10. Such parameters are indicative of (or used to determine) features in a surrounding environment of the mobile host 10, e.g., buildings, curbs, trees, vehicles, bridges, etc. The controller 20 also computes reprojection factors via the processor 21, and thereafter linearizes around the initial estimates.

As appreciated in the art, "reprojection factors" in an optimization context when used by the V-SLAM system 15 of FIG. 1 determine how well an estimated 3D structure (e.g., the buildings 13 of FIG. 1) and camera poses match a camera's actual observations. In general, reprojection factors for each feature map point with respect to a given camera frame are computed by projecting the triangulated 3D feature map points into a 2D image plane. The non-linear projection factors are linearized, e.g., using a Taylor series expansion around its initial estimates using Jacobians. For each feature map point, the Jacobian blocks are aggregated through its different viewpoints (camera frames) before computing its information matrix.

That is, parameters estimation may include projecting observed 3D points in a scene onto a 2D image plane, with the camera's pose and 3D position then estimated. The estimated pose and position are reprojected by the controller 20 of FIG. 1 onto the image plane as initial estimates, with reprojection error being the difference between the original observation and the reprojection. Block B102 may also include linearizing around these initial estimates and computing Jacobians using the processor(s) 21 of FIG. 1. The method 100 then proceeds to block B104.

At block B104, for each feature map point 26, the controller 20 aggregates Jacobian blocks observes through different camera viewpoints (frames) and computes the information matrix (A). As appreciated, block B104 may enable batch processing of feature map points, group related poses, scenes, etc., and allow for faster convergence and more efficient handling of eventual outlier rejection. The method 100 proceeds to block B106 after aggregation is completed and the information matrix (A) is computed for each feature map point 26.

Block B106 in the non-limiting embodiment of FIG. 4 includes calculating a single value decomposition (SVD) of the information matrix (A) for each feature map point 26 and thereafter calculating a condition number k(A) for the feature map point 26, i.e., (A). As appreciated, SVD is a fundamental matrix factorization method that may be used to decompose a matrix for the feature map point into the product of orthogonal matrices U and $V^T$ and diagonal matrix $\Sigma$, i.e., $A=U\Sigma V^T$, with singular values $\delta_{min}$, $\delta_2$, . . . , $\delta_{max}$ on the diagonals sorted in descending order. The condition number k(A) may be derived from the SVD and used as set forth below, with k(A) being the ratio of the maximum and minimum singular values for the feature map point 26 from the various camera frames, i.e., $$\frac{\delta_{max}}{\delta_{min}}.$$

The condition number k(A) ulus serves as a measure of how each feature map point contributes to an ill-conditioned system. A relatively large condition number indicates an ill-conditioned matrix, thus indicating instability of the system. Conversely, a condition number close to 1 indicates a well-conditioned matrix, meaning the modeled system is stable. The method 100 proceeds to block B107 once the condition number k(A) has been determined.

At block B107, and referring to FIG. 4 together with FIG. 5, the controller 20 compares the condition number k(A) from block B106 to a first condition number threshold T1 ("first threshold") indicative of an ill-conditioned map point. As shown in plot 55 of FIG. 5, which depicts conditions number k(A) on the vertical axis and a map point index or identifying point number on the horizontal axis, a nominal condition number k(A)=50 may be used in a representative example, in which T1=50. The actual condition number will vary with the intended application, with k(A)=50 being a nominal/representative value solely for illustrative purposes. The method 100 proceeds to block B108 when the condition number k(A) exceeds the first threshold T1, and to block B109 in the alternative when the condition number k(A) is less than the first threshold T1.

At block B108, the controller 20 of FIG. 1 rejects the feature map point (A) 26 as having an unacceptably elevated level of uncertainty. A scalar $s_{ij}$ is defined based on the condition number k(A). As appreciated in the art, a covariance matrix is a statistical measure that indicates the uncertainty of the feature map point 26. Using dynamic covariance scaling as part of the method 100, a new covariance matrix may be produced, i.e., $\Sigma_{new}=s_{ij}\cdot\Sigma_{old}$.

To reject the outliers, the controller 20 of FIG. 1 may apply an infinite (o) value as the scalar $s_{ij}$ in block B108. The ill-conditioned feature map point/outlier is rejected due to its high value relative to the first threshold T1, with the outlier deemed to be unstable and not optimized during the bundle adjustment process (block 33 of FIG. 2). The method 100 is then complete for the particular map point under consideration. The trajectory of curve 55 in FIG. 5 may be tuned so that ill-conditioned feature map points alone are eliminated, i.e., without also sacrificing moderately ill-conditioned feature map points.

Block B109 includes comparing the condition number k(A) to a lower second condition number threshold ("second threshold") T2, i.e., one that is lower than the first threshold T1, indicative of a moderately ill-conditioned map point. In the non-limiting example of FIG. 5, a nominal condition number k(A)=25 may be used, which is half of the first threshold T1, without limiting the disclosure to such a representative set of condition numbers k(A). The method 100 of FIG. 5 proceeds to block B110 when the condition number k(A) exceeds the second threshold T2 while remaining less than the first threshold T1, and to block B112 in the alternative when the condition number k(A) is less than the second threshold T2.

Continuing with the discussion of FIG. 4, block B110 includes dynamically scaling the feature map point, e.g., as a non-linear function of the above-described condition number k(A). This action provides reduced confidence to the feature map points proportional to their stability and thus mitigates the point's negative effects without rejecting the map point outright. Retaining the point in scaled form thereby helps to maintain the structure of an imaged scene. For instance, a scalar value $s_{ij}$ greater than 1 may be determined as a non-linear function of the condition number k(A) and used to scale the feature map point accordingly. Depending on where the map point falls after such scaling, the point may still be used to generate the 3D point cloud rather than being rejected outright like feature map points 26 exceeding the first threshold T1.

The method 100 is complete for the particular feature map point 26 under consideration after the controller 20 has completed the described actions. Values of T1 and T2 are carefully tuned based on the data. Significant filtering of the feature map points 26 may negatively affect construction of a valid map that is representative of the environment. The condition number thresholds T1 and T2 are tuned to maximize accuracy of mobile pose estimation with constraints on percentage of feature map points 26 that are filtered.

At block 112, the method 100 of FIG. 4 includes passing the feature map point 26 without scaling, i.e., applying a unitary scalar value ($s_{ij}$=1), thereafter using the feature map point to generate the 3D point cloud for use by the navigation system 27 of FIG. 1.

Using the above teachings, improvements to map generation and accuracy of the navigation system 27 are enabled by a condition number-based outlier rejection method and dynamic covariance scaling. Navigation in a signal-compromised variant of the surrounding environment 12 of FIG. 1 is thus improved in the presence of large numbers of incorrect feature pairs from images showing similar patterns, such as the illustrated urban canyon, or in poor lighting conditions, etc. The present approach enables rejection of under-constrained feature map points by modeling the contribution of each feature map point to the system's stability and rejecting ill-conditioned feature map points.

Additionally, negative effects of critical points deemed "moderately ill-conditioned" are mitigated via dynamic scaling, thus maintaining the 3D map representation of the surrounding environment 12. In contrast with state-of-the art methods such non-deterministic iterative methods, e.g., random sample consensus (RANSAC), robust kernels, ratio testing, least squares, etc., the present solutions embodied as method 100 of FIG. 4 may be applied to autonomous driving and other use cases in which large numbers of incorrect features pairs may be present. These and other attendant benefits will be readily appreciated by those skilled in the art in view of the foregoing disclosure.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A Visual Simultaneous Localization and Mapping (V-SLAM) system for a mobile host, comprising:
- a sensor suite operable for sensing and outputting raw input data indicative of a position of features in a surrounding environment of the mobile host; and
- a controller in communication with the sensor suite, wherein the controller includes a processor and a computer storage medium containing computer-readable instructions, and wherein execution of the instructions by the processor causes the controller to:
  - receive the raw input data from the sensor suite;
  - determine initial estimates of parameters of the mobile host using the input data;
  - calculate three dimensional (3D) coordinates of a plurality of feature map points based on the initial estimates of the parameters, including one or more poses of the mobile host;
  - identify outliers in the plurality of feature map points using condition numbers as a predetermined linear algebra property, including comparing the feature map points to a plurality of condition number thresholds;
  - dynamically filter out the outliers, using a dynamic covariance scaling approach utilizing the predetermined linear algebra property, to generate a filtered feature map point set; and
  - transmit the filtered feature map point set to a navigation system of the mobile host.

2. The V-SLAM system of claim 1, wherein the sensor suite includes global positioning system (GPS) receiver and one or more cameras, and wherein the raw input data includes multi-frame image data of the surrounding environment from the one or more cameras and GPS position data from the GPS receiver indicative of an initial estimate of a current position of the mobile host.

3. The V-SLAM system of claim 2, wherein the sensor suite includes an inertial measurement unit (IMU) configured to output IMU data indicative of a pose measurement of the mobile host at the current position, and wherein the processor is configured to determine the one or more poses of the host system using the IMU data.

4. The V-SLAM system of claim 1, wherein the execution of the instructions by the processor causes the controller to:
- estimate a respective one of the condition numbers, as estimated condition numbers, for each respective one of the feature map points; and
- assign a corresponding condition category for each of the feature map points based on the estimated condition numbers.

5. The V-SLAM system of claim 4, wherein the condition category includes a first category for (i) well-conditioned feature map points, (ii) a second category for moderately ill-conditioned feature map points, and (iii) a third category for the outliers.

6. The V-SLAM system of claim 5, wherein the execution of the instructions by the processor causes the controller to:
- dynamically scale the moderately ill-conditioned feature map points as a non-linear function of the condition number, thereby producing scaled feature map data points; and
- transmit the scaled feature map data points to the vehicle system with the filtered feature map point set.

7. The V-SLAM system of claim 1, wherein the sensor suite is connected to a vehicle body of a vehicle, and wherein the mobile host includes the vehicle.

8. The VSLAM system of claim 1, wherein the host system is a vehicle.

9. A method for controlling a mobile host having a Visual Simultaneous Localization and Mapping (V-SLAM) system, the method comprising:
- receiving raw input data from a sensor suite of the mobile host;
- determining, via a processor of the V-SLAM system, initial estimates of parameters of the mobile host indicative of a corresponding position of features in a surrounding environment of the mobile host;

using the input data to estimate poses of the mobile host and three dimensional (3D) coordinates of a plurality of feature map points based on the poses of the mobile host;

identifying outliers in the feature map points using condition numbers as a predetermined linear algebra property, wherein identifying the outliers includes comparing the feature map points to a plurality of condition number thresholds;

dynamically filtering out the outliers, using dynamic covariance scaling, to generate a filtered feature map point set; and transmitting the filtered feature map point set to a navigation system of the mobile host to control a setting thereof.

10. The method of claim 9, wherein determining the initial estimates of the parameters of the mobile host is performed using a global positioning system (GPS) receiver, one or more cameras, and an inertial measurement unit (IMU) of the sensor suite, wherein the parameters include multi-frame image data from the one or more cameras, GPS position data from the GPS receiver, and IMU data indicative of a pose of the mobile host at a current position of the mobile host.

11. The method of claim 9, further comprising:

estimating a respective one of the condition numbers, as estimated condition numbers, for each respective one of the feature map points; and assigning a corresponding condition category for each of the feature map points based on the estimated condition numbers.

12. The method of claim 11, wherein assigning the corresponding condition category includes assigning (i) a first category for well-conditioned feature map points, (ii) a second category for moderately ill-conditioned feature map points, and (iii) a third category for the outliers.

13. The method of claim 12, further comprising:

dynamically scaling the moderately ill-conditioned feature map points as a non-linear function of the condition number, thereby producing scaled feature map data points; and transmitting the scaled feature map data points to the navigation system along with the filtered feature map point set.

14. The method of claim 9, wherein the mobile host is a vehicle.

15. A vehicle comprising:

a vehicle body;

a set of road wheels connected to the vehicle body;

a navigation system; and a Visual Simultaneous Localization and Mapping (V-SLAM) system, comprising:

a sensor suite connected to the vehicle body and operable for sensing and outputting raw input data, the sensor suite including a global positioning system (GPS) receiver, one or more cameras, and an inertial measurement unit (IMU) respectively configured to output, as the raw input data, (i) GPS position data, (ii) multi-frame image data, and (iii) IMU data indicative of a pose of the vehicle; and a controller in communication with the sensor suite and configured to:

receive the raw input data from the sensor suite;

use the raw input data to estimate poses of the vehicle and three dimensional (3D) coordinates of a plurality of feature map points in the multi-frame image data;

identify outliers in the feature map points using condition numbers as a predetermined linear algebra property;

dynamically filter out the outliers, via a dynamic covariance scaling process, to generate a filtered feature map point set, including identifying the outliers via comparison of the condition numbers to a plurality of condition number thresholds; and transmit the filtered feature map point set to the navigation system.

16. The vehicle of claim 15, wherein the controller is configured to:

estimate a respective one of the condition numbers, as estimated condition numbers, for each respective one of the feature map points; and assign a corresponding condition category for each of the feature map points based on the estimated condition numbers.

17. The vehicle of claim 16, wherein the controller is configured to compare the condition numbers for each of the feature map points to two or more condition number thresholds when dynamically filtering out the outliers.

18. The vehicle of claim 17, wherein the controller is configured to select the corresponding condition category as one of three different condition categories, the three different condition categories including (i) a first category for well-conditioned feature map points, (ii) a second category for moderately ill-conditioned feature map points, and (iii) a third category for the outliers.

19. The vehicle of claim 18, wherein the controller is configured to:

dynamically scale the moderately ill-conditioned feature map points as a non-linear function of the condition number, thereby producing scaled feature map data points; and transmit the scaled feature map data points to the navigation system with the filtered feature map point set.

20. The vehicle of claim 15, wherein the V-SLAM system includes:

a frontend architecture operable for outputting optimized poses and three-dimensional (3D) feature map points for the vehicle; and a backend architecture operable for receiving the optimized poses and 3D feature map points from the frontend architecture, merging the optimized 3D feature map points with global data from a plurality of additional vehicles to form merged location data, and communicating a loop closure signal to the frontend architecture that is indicative of the merged location data.

* * * * *